Oct. 11, 1960     J. W. ANDERSON     2,955,313
WINDSHIELD WIPER BLADE ASSEMBLY AND PRESSURE DEVICE THEREFOR
Filed Sept. 13, 1956
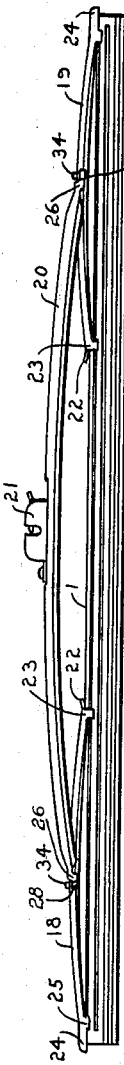
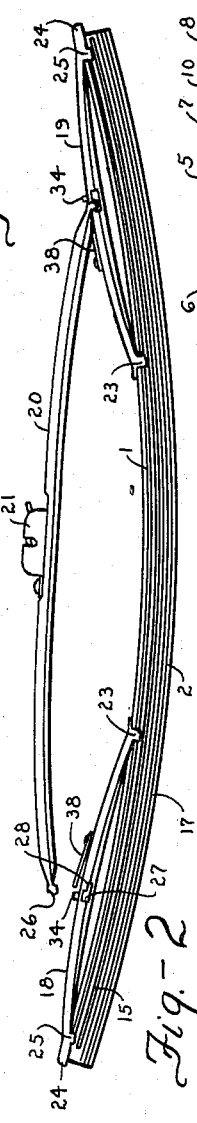
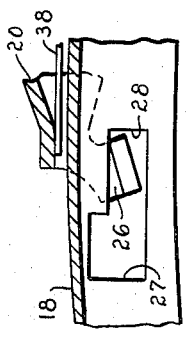
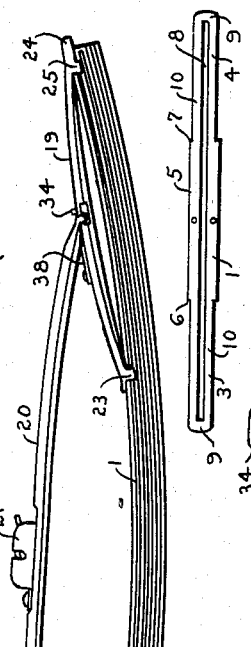
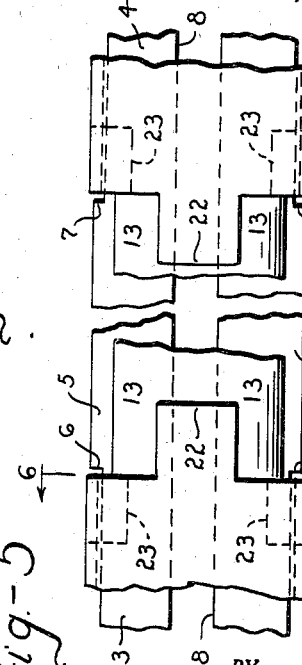
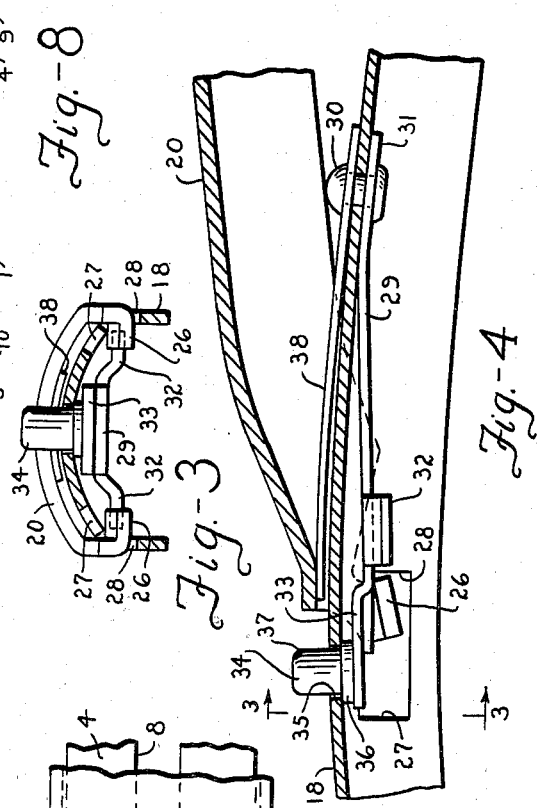
INVENTOR.
JOHN W. ANDERSON
BY
Charles S. Penfld
ATTORNEY United States Patent Office 2,955,313
Patented Oct. 11, 1960

2,955,313

WINDSHIELD WIPER BLADE ASSEMBLY AND PRESSURE DEVICE THEREFOR

John W. Anderson, 578 Broadway, Gary, Ind.

Filed Sept. 13, 1956, Ser. No. 609,631

11 Claims. (Cl. 15—250.42)

This invention relates generally to windshield wipers and more particularly to a wiper which will wipe a windshield having curved or flat surfaces or combinations of these surfaces.

The wiper may be constructed in various ways, but as herein shown comprises a blade assembly and a pressure-distributing device operatively connected to the blade assembly. The blade assembly or unit includes a resilient wiping element and a resiliently flexible support detachably connected to the element and the pressure device or unit preferably includes a pair of secondary yokes having their ends connected to the blade at longitudinally spaced points, a bridge or primary yoke having its ends connected to the secondary yokes, and a connector carried by the bridge for attachment with a wiper arm.

More particularly, the support of the blade assembly is preferably formed with reduced corresponding extremities to which the secondary yokes are respectively connected. In other words, the support is of a lesser width or narrower at its extremities than along its central area. A secondary yoke slidably receives each of these extremities for applying pressure thereto and, due to this variation in width, shoulders are formed on the support to provide abutment means or stops which are preferably engageable with the inner ends of the secondary yokes for predetermining the extent of the relative sliding movement between the pressure device and blade assembly.

Another object of the invention is to provide a wiper in which the secondary yokes are preferably first slid onto the reduced extremities of the support, after which the ends of the bridge are connected to the secondary yokes.

A significant object of the invention is to provide improved snap connection means for detachably connecting the bridge to the secondary yokes. More specifically in this respect, provision is made whereby to facilitate or expedite manual operation of the connection means to disconnect the bridge from the secondary yokes.

An important object of the invention is to provide a wiper in which the components thereof are so designed and constructed that the pressure device can only be operatively connected or disconnected with respect to the blade assembly by moving the latter to an abnormal condition. More particularly in this regard, the arrangement is preferably such that the blade assembly has to be bent to an abnormal curved condition before the bridge can be attached to the connection means on the secondary yokes.

A specific object of the invention is to provide means for resiliently supporting or mounting the ends of the bridge on the secondary yokes for the dual purpose of yieldably urging the secondary yokes in a direction toward a windshield and reducing noise between the yokes during operation of the wiper back and forth across the windshield.

A further object of the invention is to provide an organization of the kind above described in which the ends of the secondary yokes find resilient support on the resilient wiping element for yieldably urging the blade assembly toward a windshield and for decreasing the area of metal-to-metal contact between the secondary yokes and blade assembly and thereby reduce noise during operation of the wiper.

Other objects and advantages of the invention will become apparent after the description hereinafter set forth is considered in conjunction with the drawings annexed hereto.

In the drawings:

Figure 1 is an elevational side view of the wiper;

Figure 2 is also an elevational side view exemplifying one procedure of attaching the pressure device to the blade assembly;

Figure 3 is an enlarged transverse sectional view taken substantially on line 3—3 of Figure 4 showing details of one of the connections between the bridge or primary yoke and a secondary yoke;

Figure 4 is an enlarged partial side view of the pressure device illustrating additional details of the connection shown in Figure 3;

Figure 5 is an enlarged partial top view showing the relationship of the inner ends of the secondary yokes and the abutment means on the flexible support of the blade assembly;

Figure 6 is a transverse section taken substantially on the line 6—6 of Figure 5 depicting the cross-sectional characteristics of the resilient wiping element and mode of supporting the ends of the secondary yokes on the element;

Figure 7 is an enlarged partial sectional view showing the manner in which the ends of the bridge are located in openings provided in the secondary yokes; and Figure 8 is a view showing the character of the support constituting a component of the blade assembly.

As exemplified in Figures 1, 5 and 8 of the drawings, the blade assembly includes a resiliently flexible support 1 and a resilient wiper element 2. The support is elongate and of uniform thickness with corresponding reduced end extremities 3 and 4 and an intermediate portion 5 of a greater width than the extremities. This variation in width forms shoulders which provide longitudinally spaced abutment means 6 and 7. The support is preferably provided with an elongate narrow slot 8 terminating short of the ends of the support to provide connecting or hinge portions 9 whereby longitudinal parallel portions 10 of the support can be spread apart to enlarge the size of the slot so that the resilient element 2 can properly be located therein, after which the longitudinal portions 10 are released to cause such portions to interlock with the element. As further shown in Figure 8, each of the longitudinal portions is provided with an aperture for receiving a tool to assist in spreading the portions apart.

The resilient element 2, as depicted in Figure 6, is preferably formed in one piece with opposed longitudinally extending exterior grooves 11 therein to provide a neck 12. The grooves 11 receive the inner marginal edge portions of the longitudinal portions 10 with the neck 12 between such portions so that upper portions 13 and lower portions 14 of the element engage the upper and lower surfaces of the support as depicted in Figure 6. The element is further formed with a second pair of opposed longitudinally extending exterior grooves 15 to provide a hinge 16 to permit a controlled pivotal movement of a wiping head 17 having wiping edges thereon.

The pressure-distributing device may comprise relatively movable parts and as shown includes a pair of corresponding secondary yokes 18 and 19 having their ends detachably connected to the support, a bridge or primary yoke 20 having its ends detachably connected to intermediate portions of the secondary yokes, and a connector 21 carried by the bridge for detachable connection with a wiper arm.

The secondary yokes 18 and 19 are preferably identical in design and construction. The inner end of the base wall of each secondary yoke is formed to provide a transverse arcuate or curved medial portion 22 for rockable engagement with the upper part of the wiper element, as illustrated in Figure 6. The inner end of each of these yokes is also provided with a pair of corresponding ears 23 disposed under the support for engagement therewith as evidenced in Figures 5 and 6. The outer end of each secondary yoke is provided with a shroudlike end wall 24 which serves to conceal the ends of the support. The outer end of each of the secondary yokes, is also provided with a pair of ears 25 spaced inwardly from its end wall 24 for engagement with the underside of the support. The outer end portion of the base wall of each of the secondary yokes may also rockably bear against the upper portion of the wiper element in a manner similar to the medial portion 22. The pairs of ears 23 and 25 of the yoke 18 and the corresponding ears of the yoke 19 afford a sliding fit between these yokes and the reduced extremities of the support. The secondary yokes are preferably assembled with the support by merely sliding the yokes inwardly along the reduced extremities of the support until the inner ends of the yokes engage the abutment means 6 and 7 after which the bridge is attached to the secondary yokes in a manner which will be described more in detail subsequently.

As pointed out above, one of the objects of the invention is to provide improved means for detachably connecting the ends of the bridge to the secondary yokes. The means for this purpose preferably includes providing each end of the bridge with a pair of inturned corresponding projections or fingers 26, and the intermediate portion of each secondary yoke with a pair of generally L-shaped openings which receive the fingers. Each opening includes an entrance 27 leading to a slot 28, the latter extending in a direction toward the inner end of a secondary yoke. It will be noted that the upper portions of each pair of opposed entrances 27 are disposed closer together than the slots 28 so that the entrances will receive the fingers 26 on the primary yoke when the fingers are first introduced into the L-shaped openings during the assembly operation.

Resilient means preferably in the form of a generally T-shaped spring 29, constituting a locking element, is secured substantially within the confines of each secondary yoke by a rivet 30 or equivalent means. Each spring includes an inclined leg 31 through which the rivet extends, a pair of offset corresponding arms 32 and an offset finger or rest portion 33 which is somewhat shorter than the leg 31. The springs are of a size and length and so connected to the yokes that they are readily yieldable and positive in action. The arms 32 of each spring are preferably of a size whereby they may engage the inner surfaces of the side walls of a yoke for guidance so as to center the finger 33 for positive engagement with a fastener or button 34 movable in a hole 35 provided therefor in each secondary yoke. Each button is located substantially midway between an adjacent pair of entrances 27. Each fastener preferably includes an inner concealed enlarged portion 36 which is caught between a secondary yoke and a finger 33 and an outer exposed portion 37 for manipulation as will be described more in detail subsequently.

Another form of a detachable connection between members of a pressure device is disclosed in my Patent No. 2,897,530 dated August 4, 1959.

As set forth above, one of the objects of the invention is to provide means for resiliently supporting the ends of the bridge on the secondary yokes for the purpose of reducing noise and urging the secondary yokes in a direction toward the blade assembly.

The resilient means may be designed and constructed in various ways, but as shown such means comprises a pair of corresponding elongate leaf springs 38 having their inner ends respectively secured to the secondary yokes by the rivets 30. Each spring is mounted at an inclination with its outer free extremity arranged for disposition between a secondary yoke and an outer extremity of the bridge as clearly depicted in Figures 2 and 4. With this unique organization, the ends of the bridge rest and find support on the resiliently flexible extremities of the springs. If found desirable, the springs 38 could be carried by the ends of the bridge in lieu of being carried by the secondary yokes.

In view of the foregoing, it will be apparent that the inner ends of the secondary yokes are engageable with the longitudinally spaced abutment means 6 and 7 for holding the yokes on the reduced extremities of the support of the blade assembly when the ends of the bridge are attached to the secondary yokes.

The manner of attaching the pressure device to the blade assembly may be accomplished in different ways, but as exemplified in Figure 2 in the drawing it is preferably accomplished by sliding or telescoping the secondary yokes onto the reduced extremities of the support of the blade assembly until the yokes engage the abutment means 6 and 7, after which one end of the bridge is attached to the secondary yoke 19, whereupon the blade assembly is bent to the bowed or abnormal position so that the other end of the bridge can be connected to the other secondary yoke 18. If desired, the pressure device can also be attached to the blade assembly by sliding one secondary yoke on the blade assembly, then connecting one end of the bridge to the other secondary yoke and sliding the latter onto the blade assembly, after which the blade assembly is bowed so that the other end of the bridge can be attached to said one secondary yoke. After the pressure device is attached to the blade assembly by employing either of the aforesaid procedures or any other procedure, it is intended that the blade assembly will automatically return to a substantially straight condition or to a condition whereby the ends of the bridge are held connected with the secondary yokes.

More particularly, it will be noted by referring to Figure 1 that the longitudinal distance between the pairs of fingers 26 on the bridge is substantially equal to the longitudinal distance between the pairs of slots 28, so that the fingers will be loosely disposed in the slots or float therein when the wiper is in the position shown in this figure or the blade assembly is in operative conforming relationship with a windshield. The longitudinal distance between the pairs of entrances 27 is somewhat greater than the longitudinal distance between the slots so it is necessary to bend the blade assembly to reduce the straight distance between the entrances to substantially correspond with the distance between the fingers in order that the last end of the bridge to be connected to a secondary yoke can be brought into a position, whereby the fingers thereon can be manually directed into the entrances therefor in advance of being received in the adjacent slots.

It will be noted that exposed portions 37 of the buttons are not only located between the respective pairs of entrances but extend outwardly predetermined distances which require depression of the buttons by the ends of the bridge before the fingers can be received in the entrances. Thus, as viewed in Figure 2, the fingers on the free end of the bridge are received in the entrances 27 of the secondary yoke 18 after the end of the bridge is manually urged against the left button to cause retraction thereof a sufficient distance to permit the fingers to move into the slots as the bridge end slides over the button, and when the fingers are substantially completely received in the slots the bridge end will clear the button whereupon the button will snap outwardly due to the pressure exerted by a spring 33. In other words, the successive entry of the fingers at the opposite ends of the bridge into the entrances and slots is dependent on the relative positions of the buttons.

Attention is directed to the fact that when the wiper is assembled as depicted in Figures 1 and 4, the fingers are loosely disposed for movement in the slots and that the fits are such that any relative or rocking movements occurring between the ends of the bridge and secondary yokes is controlled or predetermined in order to promote the operation of the wiper when it is oscillated across a windshield. In fact, the ends of the bridge in some measure float with respect to the secondary yokes since the ends are resiliently supported by the resilient means 38 as alluded to above.

The pressure device is preferably readily disconnected from the blade assembly by merely pressing down on one of the buttons and then bending the blade assembly so that one end of the bridge will ride outwardly and over the button and simultaneously move the fingers on the bridge end from the slots into the entrances to permit release of the fingers therethrough, after which the secondary yokes and bridge are slid outwardly in opposite directions apart from the blade assembly in order that a new blade assembly may be substituted when required.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A windshield wiper blade assembly and a pressure device therefor comprising a plurality of relatively movable rigid parts operatively connected with one another and the blade assembly, a leaf spring located at least at one of the connections between a pair of the parts for receiving the thrust from one of the parts when it is forced toward the other part by pressure derived from a wiper arm, and means for readily releasing the parts.

2. A windshield wiper blade assembly and a pressure device therefor comprising a pair of yokes connected to the blade assembly and a bridge having ends connected to the yokes, a leaf spring for receiving thrust from at least one of the ends of the bridge when the latter is urged toward a yoke by pressure derived from a wiper arm, and means for readily releasing at least one of the ends of the bridge from one of the yokes.

3. A pressure-distributing assembly for use with a windshield wiper blade, said assembly comprising a pair of pressure members, one of said members being provided with a pair of receiving means and openings leading thereto and the other member having a pair of projections receivable in the receiving means through said openings, one of said members being provided with an aperture means extending through the aperture and constituting an abutment for the other member for detachably locking the projections in the receiving means, and resilient means interposed between the members for urging them in opposite directions.

4. A windshield wiper comprising: a blade assembly having a resilient wiping element and a resiliently flexible support therefor having reduced end extremities forming with an intermediate portion thereof a pair of abutment means, a pressure-distributing device comprising a bridge and a pair of secondary yokes with the ends of the yokes respectively mounted on said end extremities with the inner ends of the secondary yokes located on opposite sides of the abutment means, a pair of means respectively connecting the ends of the bridge with the secondary yokes, at least one of said connecting means comprising a pair of openings and seats accessible through the openings provided in one of the secondary yokes with the seats disposed between the openings and the inner end of the yoke and including a pair of projections on one end of the bridge insertable through said openings for disposition relative to said seats, and an elongate leaf spring extending lengthwise between said last-mentioned secondary yoke and said end of the bridge affording a resilient support for said end of the bridge.

5. A windshield wiper comprising a resiliently flexible blade provided with abutment means and a pressure device, said device comprising a pair of yokes mounted on the blade and engageable with spaced abutment means for limiting relative longitudinal movement between the blade and yokes, at least one of said yokes being provided with receiving means, a bridge having an end attached to the other yoke and another end caught in the receiving means to hold the bridge rockably connected to said one yoke to prevent separation of the blade and device, a leaf spring secured between said bridge and said one yoke for cushioning the rocking movement therebetween, the arrangement being such that when the blade is manually flexed to an abnormal condition the end of the bridge caught in the receiving means may be removed therefrom.

6. A windshield wiper comprising a resiliently flexible wiper blade and a pressure device having a bridge and a pair of yokes, said yokes being mounted on the blade and each yoke being provided with a pair of openings, each end of said bridge having a pair of portions respectively caught in a pair of the openings, an aperture provided in each of the yokes, spring-pressed abutments respectively extending through the apertures and serving to lock the pairs of bridge portions in said pairs of openings, the arrangement being such that when the blade is flexed to an abnormal condition and one of the abutments is depressed the portions of the bridge adjacent thereto can be released from the openings within which they were held.

7. A windshield wiper blade and a pressure device therefor comprising a pair of yokes mounted on the blade and a bridge having extremities, means detachably connecting one of the extremities with one of the yokes, means connecting the other of the extremities with the other yoke, means extending from said last-mentioned connecting means for locking the same, a pair of leaf springs respectively interposed between the extremities of the bridge and the yokes providing a resilient support for the bridge.

8. A pressure-distributing assembly for use with a windshield wiper blade, said assembly comprising a pair of pressure members, one of said members being provided with a pair of receiving means and the other member having a pair of projections disposed in the receiving means, resiliently urged abutment means for holding the projections in the receiving means, and a leaf spring having an end interposed between the members serving to urge them in opposite directions, said abutment means when depressed affording means whereby the projections may be released from the receiving means.

9. A pressure-distributing subassembly for use with a resiliently flexible windshield wiper blade comprising a pair of pressure yokes, one of said yokes being provided with seat means and the other with projection means disposed on said seat means, yieldable means, said one yoke being provided with an opening, and a manually operable member extending into the opening and supported on the yieldable means for releasably locking the projection means on the seat means.

10. A pair of pressure members for distributing pressure from a windshield wiper arm to a wiper blade, one of said members being provided with a pair of openings and the other with a pair of projections disposed in the openings, yieldable means for locking the projections in the openings, resilient means for cushioning the movement between the members, and means common to both the yieldable means and the resilient means for securing them in their respective operative positions to said one member.

11. A pressure-distributing assembly for use with a windshield wiper blade comprising a pair of pressure members and a bridge member, each of said pressure members being provided with a pair of seats and a pair of openings leading thereto, each end of the bridge member having a pair of projections insertable through a pair of openings disposed relative to said pair of seats, a pair of elongate yieldable means extending lengthwise of the assembly, each of said pressure members being provided with an aperture adjacent each pair of openings, a pair of manually operable means respectively supported by said pair of yieldable means and extending through said apertures for locking said pairs of projections relative to said seats and facilitating their disconnection therefrom, and elongate resilient means permanently connected to one of the members and extending lengthwise over one of the yieldable means affording a resilient support for at least one end of the bridge member on one of said pressure members.

References Cited in the file of this patent

UNITED STATES PATENTS

| | | |
|---|---|---|
| 2,667,656 | Oishei | Feb. 2, 1954 |
| 2,706,291 | Rappl | Apr. 12, 1955 |
| 2,727,270 | Bosso | Dec. 20, 1955 |
| 2,782,445 | Krohm | Feb. 26, 1956 |
| 2,807,821 | Scinta | Oct. 1, 1957 |

FOREIGN PATENTS

| | | |
|---|---|---|
| 1,003,521 | France | Apr. 1, 1953 |

UNITED STATES PATENT OFFICE

CERTIFICATE OF CORRECTION

Patent No. 2,955,313            October 11, 1960

John W. Anderson

It is hereby certified that error appears in the printed specification of the above numbered patent requiring correction and that the said Letters Patent should read as corrected below.

Column 5, lines 55 and 56, for "aperture means" read -- aperture, means --.

Signed and sealed this 25th day of April 1961.

(SEAL)
Attest:
ERNEST W. SWIDER
Attesting Officer

DAVID L. LADD
Commissioner of Patents